US012159056B2

(12) United States Patent
Sutera et al.

(10) Patent No.: US 12,159,056 B2
(45) Date of Patent: Dec. 3, 2024

(54) EXTENDING FUNCTIONALITY OF MEMORY CONTROLLERS IN A PROCESSOR-BASED DEVICE

(71) Applicant: Ampere Computing LLC, Santa Clara, CA (US)

(72) Inventors: Massimo Sutera, Sunnyvale, CA (US); Sandeep Brahmadathan, Dublin, CA (US); Nagi Aboulenein, King City, OR (US); Brian Thomas Chase, Campbell, CA (US); James Edward Casteel, Portland, OR (US); Kha Minh Huynh, Ho Chi Minh (VN); Vung Thanh Huynh, Ho Chi Minh (VN)

(73) Assignee: Ampere Computing LLC, Santa Clara, CA (US)

( * ) Notice: Subject to any disclaimer, the term of this patent is extended or adjusted under 35 U.S.C. 154(b) by 67 days.

(21) Appl. No.: 17/856,299

(22) Filed: Jul. 1, 2022

(65) Prior Publication Data

US 2024/0004577 A1 Jan. 4, 2024

(51) Int. Cl.
*G06F 3/06* (2006.01)

(52) U.S. Cl.
CPC .......... *G06F 3/0656* (2013.01); *G06F 3/0619* (2013.01); *G06F 3/0659* (2013.01); *G06F 3/0679* (2013.01)

(58) Field of Classification Search
CPC .... G06F 3/0656; G06F 3/0619; G06F 3/0659; G06F 3/0679
See application file for complete search history.

(56) References Cited

U.S. PATENT DOCUMENTS

2012/0096257 A1* 4/2012 Li ...................... G06F 21/6218
                                                        713/150
2019/0332469 A1* 10/2019 Radjai .................. G06F 9/3816

\* cited by examiner

*Primary Examiner* — Tracy A Warren
(74) *Attorney, Agent, or Firm* — Withrow & Terranova, PLLC

(57) ABSTRACT

Apparatus and methods for extending functionality of memory controllers in a processor-based device are disclosed herein. In one aspect, a processor-based device provides a memory access intercept circuit that is communicatively coupled to a memory controller and a memory device. The memory access intercept circuit is configured to receive a memory write request that is directed to and received by the memory controller, and generates a write transaction identifier (ID) for the memory write request. The memory access intercept circuit then generates proxy write data containing the write transaction ID, and sends the proxy write data to the memory controller. The memory access intercept circuit subsequently intercepts the actual write data directed to the memory controller, and stores the write data in a write data buffer in association with the write transaction ID.

19 Claims, 11 Drawing Sheets

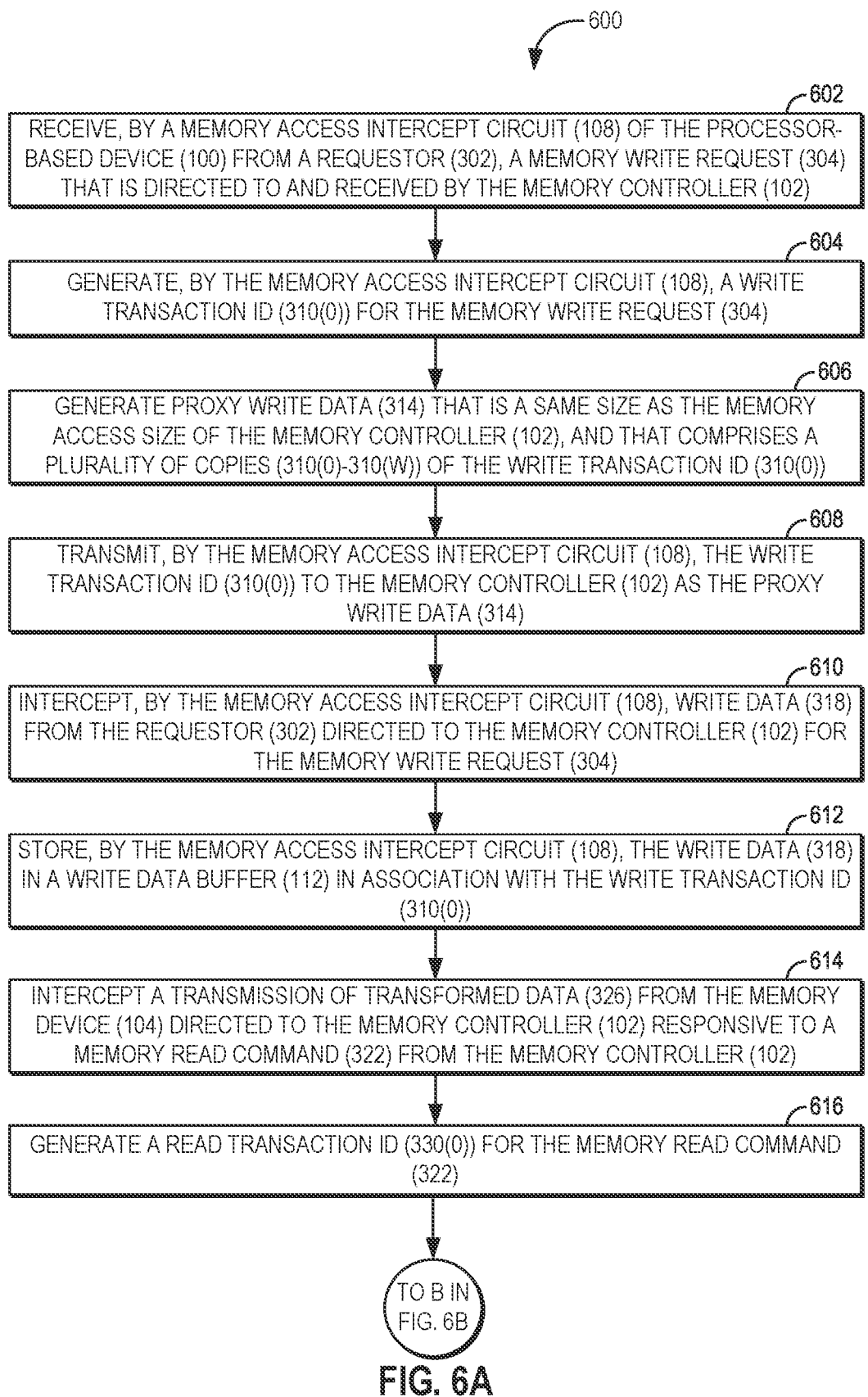

EXTENDING FUNCTIONALITY OF MEMORY CONTROLLERS IN A PROCESSOR-BASED DEVICE

BACKGROUND

I. Field of the Disclosure

The technology of the disclosure relates generally to memory controllers in a processor-based device, and specifically to extending or augmenting the functionality of a memory controller without directly modifying the memory controller.

II. Background

Modern processor-based devices provide a specialized digital circuit known as a memory controller for managing memory access operations (e.g., memory write operations and memory read operations) to a memory device such as system memory. Because the logic for managing the flow of data to and from the memory device is embodied by the memory controller, conventional approaches for extending or augmenting the functionality of the memory controller necessarily involve directly modifying the circuitry of the memory controller itself. However, such direct modifications may be rendered impossible or infeasible due to technical limitations or, in the case of third-party manufacturers, restrictions on access to the underlying intellectual property. Accordingly, a mechanism for extending the functionality of the memory controller without the need to alter the memory controller itself is desirable.

SUMMARY OF THE DISCLOSURE

Aspects disclosed in the detailed description include apparatus and methods for extending functionality of memory controllers in a processor-based device. In one aspect, a processor-based device provides a memory access intercept circuit that is communicatively coupled to a memory controller and a memory device. The memory access intercept circuit is configured to receive a memory write request that is directed to and also received by the memory controller, and generates a write transaction identifier (ID) for the memory write request. The memory access intercept circuit then generates proxy write data containing the write transaction ID, and sends the proxy write data to the memory controller. The memory access intercept circuit subsequently intercepts the actual write data directed to the memory controller, and stores the write data in a write data buffer in association with the write transaction ID. Some aspects further provide that the memory access intercept circuit performs a data transformation on the write data (e.g., by encrypting the write data and/or encoding a custom error correction code (ECC), as non-limiting examples) to generate transformed data, and transmits the transformed data to the memory device for storage in lieu of the original write data.

According to some aspects, the memory access intercept circuit is further configured to intercept transformed data that is directed to the memory controller by the memory device in response to a memory read command from the memory controller. The memory access intercept circuit generates a read transaction ID for the memory read command, and performs a data transformation on the transformed data to obtain read data (e.g., by decrypting the transformed data and/or decoding a custom ECC, as non-limiting examples). The memory access intercept circuit stores the read data in a read data buffer in association with the read transaction ID, and transmits the read transaction ID to the memory controller as proxy read data. The memory access intercept circuit then intercepts a transmission of the proxy read data from the memory controller directed to the requestor of the read data, retrieves the read data from the read data buffer based on the read transaction ID of the proxy read data, and transmits the read data to the requestor. Further operations may be performed by some aspects of the memory access intercept circuit to support Read/Modify/Write (RMW) operations.

In this regard, in one exemplary aspect, a processor-based device is provided. The processor-based device comprises a memory controller, a memory device communicatively coupled to the memory controller, and a memory access intercept circuit. The memory access intercept circuit is configured to receive, from a requestor, a memory write request that is directed to and received by the memory controller. The memory access intercept circuit is further configured to generate a write transaction ID for the memory write request. The memory access intercept circuit is also configured to transmit the write transaction ID to the memory controller as proxy write data. The memory access intercept circuit is additionally configured to intercept write data from the requestor directed to the memory controller for the memory write request. The memory access intercept circuit is further configured to store the write data in a write data buffer in association with the write transaction ID.

In another exemplary aspect, a method for extending functionality of memory controllers in a processor-based device is provided. The method comprises receiving, by a memory access intercept circuit of the processor-based device from a requestor, a memory write request that is directed to and received by the memory controller. The method further comprises generating, by the memory access intercept circuit, a write transaction ID for the memory write request. The method also comprises transmitting, by the memory access intercept circuit, the write transaction ID to the memory controller as proxy write data. The method additionally comprises intercepting, by the memory access intercept circuit, write data from the requestor directed to the memory controller for the memory write request. The method further comprises storing, by the memory access intercept circuit, the write data in a write data buffer in association with the write transaction ID.

BRIEF DESCRIPTION OF THE FIGURES

FIGS. 6A-6C provide a flowchart illustrating exemplary operations for intercepting and processing memory write requests that require an RMW operation, according to some aspects.

DETAILED DESCRIPTION

Figure 1:
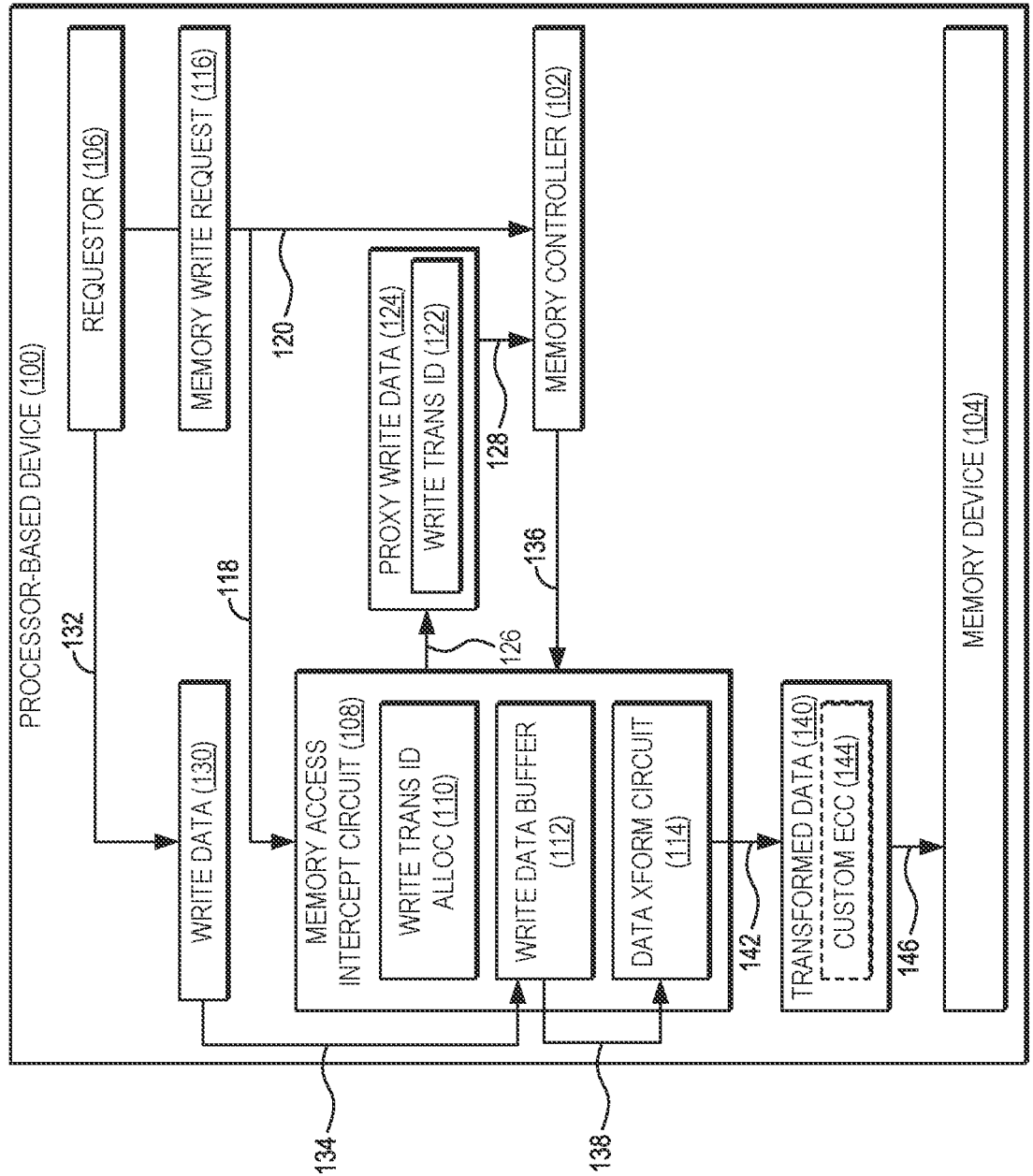
FIG. 1 is a block diagram of an exemplary processor-based device illustrating functionality of a memory access intercept circuit for intercepting and processing memory write requests for extending functionality of memory controllers in a processor-based device, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include apparatus and methods for extending functionality of memory controllers in a processor-based device. In one aspect, a processor-based device provides a memory access intercept circuit that is communicatively coupled to a memory controller and a memory device. The memory access intercept circuit is configured to receive a memory write request that is directed to and also received by the memory controller, and generates a write transaction identifier (ID) for the memory write request. The memory access intercept circuit then generates proxy write data containing the write transaction ID, and sends the proxy write data to the memory controller. The memory access intercept circuit subsequently intercepts the actual write data directed to the memory controller, and stores the write data in a write data buffer in association with the write transaction ID. Some aspects further provide that the memory access intercept circuit performs a data transformation on the write data (e.g., by encrypting the write data and/or encoding a custom error correction code (ECC), as non-limiting examples) to generate transformed data, and transmits the transformed data to the memory device for storage in lieu of the original write data.

According to some aspects, the memory access intercept circuit is further configured to intercept transformed data that is directed to the memory controller by the memory device in response to a memory read command from the memory controller. The memory access intercept circuit generates a read transaction ID for the memory read command, and performs a data transformation on the transformed data to obtain read data (e.g., by decrypting the transformed data and/or decoding a custom ECC, as non-limiting examples). The memory access intercept circuit stores the read data in a read data buffer in association with the read transaction ID, and transmits the read transaction ID to the memory controller as proxy read data. The memory access intercept circuit then intercepts a transmission of the proxy read data from the memory controller directed to the requestor of the read data, retrieves the read data from the read data buffer based on the read transaction ID of the proxy read data, and transmits the read data to the requestor.

Further operations may be performed by some aspects of the memory access intercept circuit to support Read/Modify/Write (RMW) operations.

In this regard, FIG. 1 illustrates an exemplary processor-based device 100 that includes a memory controller 102 and a memory device 104. The memory controller 102 of FIG. 1 is configured to receive memory access requests (e.g., memory write requests and memory read requests) directed to the memory device 104 from a requestor 106, which may comprise a system device or a process that is executing on the processor-based device 100. The memory device 104 may comprise, as a non-limiting example, a system memory comprising dynamic random access memory (DRAM). The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the processor-based device 100 may include elements in addition to those illustrated in FIG. 1. For example, the processor-based device 100 may further include one or more central processing units (CPUs), processor cores, caches, controllers, communications buses, and/or persistent storage devices, which are omitted from FIG. 1 for the sake of clarity.

As noted above, it may be desirable to extend or augment the functionality of the memory controller 102 by performing data transformation operations, such as encryption and decryption and custom ECC generation, on data to be written to the memory device 104 and/or read from the memory device 104 using the memory controller 102. However, implementing such data transformations by direct modification of the memory controller 102 may be impossible or impractical due to technical limitations and/or by restrictions on access to the underlying intellectual property.

Accordingly, the processor-based device 100 of FIG. 1 provides a memory access intercept circuit 108 that is configured to extend the functionality of the memory controller 102 without physically modifying the memory controller 102 itself, and in a manner transparent to the memory controller 102 and the memory device 104. The memory access intercept circuit 108 in the example of FIG. 1 comprises a write transaction ID allocation circuit (captioned as "WRITE TRANS ID ALLOC" in FIG. 1) 110 for generating write transaction IDs for memory write requests, a write data buffer 112 for temporary storage of information relating to memory write requests, and a data transformation circuit (captioned as "DATA XFORM CIRCUIT" in FIG. 1) 114 for performing a desired data transformation before write data is stored in the memory device 104. Functionality of the write transaction ID allocation circuit 110, the write data buffer 112, and the data transformation circuit 114 is discussed in greater detail below. It is to be understood that some aspects of the memory access intercept circuit 108 may include more or fewer elements than those illustrated in FIG. 1.

In exemplary operation, the memory access intercept circuit 108 is configured to receive, from the requestor 106, a memory write request 116 (as indicated by arrow 118) that is directed to the memory controller 102, and that is also received by the memory controller 102 (as indicated by arrow 120). This may be accomplished in some aspects by coupling the memory access intercept circuit 108 to a splitter (not shown) in a memory bus or other communications line (not shown) via which the memory controller 102 receives the memory write request 116. The memory write request 116 may comprise, as a non-limiting example, a memory address to which data will be written by the memory device 104.

Using the write transaction ID allocation circuit 110, the memory access intercept circuit 108 generates a write transaction ID (captioned as "WRITE TRANS ID" in FIG. 1) 122 for the memory write request 116. The write transaction ID 122, which may be created using conventional techniques for generating unique identifiers, is used internally by the memory access intercept circuit 108 for tracking and processing the memory write request 116. In some aspects, the write transaction ID 122 may comprise an indicator (e.g., a highest bit of the write transaction ID, as a non-limiting example) that may be used to indicate that the write transaction ID 122 is associated with a memory write operation. The memory access intercept circuit 108 is configured to then use the write transaction ID 122 to generate proxy write data 124 to be sent to the memory controller 102 in place of actual write data for the memory write request 116, as indicated by arrow 126. The memory access intercept circuit 108 then transmits the write transaction ID 122 to the memory controller 102 as the proxy write data 124, as indicated by arrow 128.

In some aspects, the memory access intercept circuit 108 is configured to ensure that a size of the proxy write data 124 matches a size that is expected by the memory controller 102. For instance, the memory controller 102 may expect data having a same size as a memory access size of the memory controller 102 (i.e., a minimum data size that can be written by the memory controller 102 to the memory device 104). In such aspects, the proxy write data 124 may comprise a plurality of copies of the write transaction ID 122. Thus, for instance, if the size of the proxy write data 124 is 64 bytes but the size of the write transaction ID 122 is one (1) byte, the memory access intercept circuit 108 will generate the proxy write data 124 to contain 64 copies of the write transaction ID 122.

The memory access intercept circuit 108 is configured to subsequently intercept write data 130 that is directed to the memory controller 102 by the requestor 106 for the memory write request 116, as indicated by arrow 132. As used herein, the term "intercept" and derivatives thereof refer to functionality of the memory access intercept circuit 108 for receiving a data transmission of data, such as the write data 130, directed to the memory controller 102, and preventing the data transmissions from reaching the memory controller 102 as intended by the sender (in this case, the requestor 106). Instead, the write data 130 is stored by the memory access intercept circuit 108 in the write data buffer 112 in association with the write transaction ID 122, as indicated by arrow 134.

The memory access intercept circuit 108 in some aspects is configured to then manipulate the write data 130 by performing a data transformation operation on the write data 130 before the memory access intercept circuit 108 sends the write data 130 to the memory device 104. Thus, in such aspects, the memory access intercept circuit 108 is configured to intercept a transmission of the proxy write data 124 from the memory controller 102 directed to the memory device 104 (i.e., as part of the conventional operation of the memory controller 102), as indicated by arrow 136. In response to intercepting the transmission of the proxy write data 124, the memory access intercept circuit 108 retrieves the write data 130 from the write data buffer 112 based on the write transaction ID 122 of the intercepted proxy write data 124, as indicated by arrow 138. The memory access intercept circuit 108 next employs the data transformation circuit 114 to perform a data transformation on the write data 130 to generate transformed data 140, as indicated by arrow 142. The data transformation according to some aspects may comprise encryption of the write data 130, and/or encoding of a custom ECC 144 based on the write data 130, as non-limiting examples. As indicated by arrow 146, the memory access intercept circuit 108 then transmits the transformed data 140 to the memory device 104, which stores the transformed data 140 in conventional fashion. In this manner, the memory access intercept circuit 108 can modify the write data 130 that is sent by the requestor 106 before the write data 130 is written to the memory device 104, in a way that is transparent to the requestor 106, the memory controller 102, and the memory device 104. Further, in contrast to conventional designs in which encryption or decryption may take place in a serial fashion before an associated memory controller can issue commands, performing encryption and decryption as described with respect to aspects of the present disclosure may permit the encryption and decryption to be performed at least in part in parallel with the associated memory controller issuing commands, which may improve latency.

Figure 2:
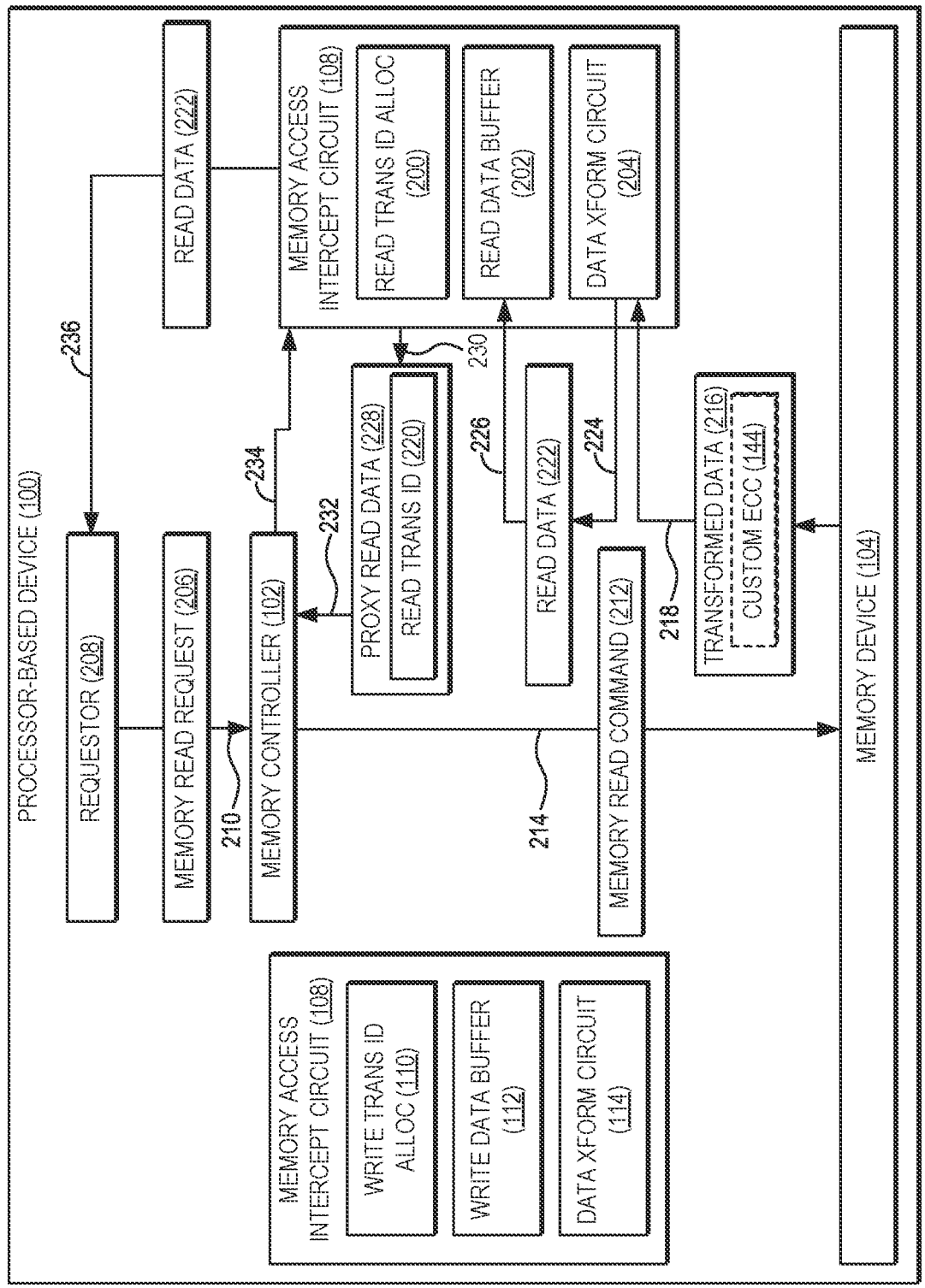
FIG. 2 is a block diagram of another aspect of the processor-based device of FIG. 1, illustrating exemplary functionality of the memory access intercept circuit for intercepting and processing memory read requests, according to some aspects.

FIG. 2 illustrates another aspect of the processor-based device 100 of FIG. 1, in which the memory access intercept circuit 108 provides further functionality for intercepting and processing memory read requests. In this regard, in FIG. 2, the memory access intercept circuit 108 further includes a read transaction ID allocation circuit (captioned as "READ TRANS ID ALLOC" in FIG. 2) 200 for generating read transaction IDs for memory read requests, a read data buffer 202 for temporary storage of information relating to memory read requests, and a data transformation circuit (captioned as "DATA XFORM CIRCUIT" in FIG. 2) 204 for transparently performing a data transformation on data read from the memory device 104 (e.g., to reverse a previous data transformation performed by the data transformation circuit 114). Functionality of the read transaction ID allocation circuit 200, the read data buffer 202, and the data transformation circuit 204 is discussed in greater detail below. It is to be understood that the memory access intercept circuit 108 is illustrated as two separate elements in FIG. 2 only for the sake of clarity in describing the communications flows disclosed herein, and that the memory access intercept circuit 108 in aspects disclosed herein may be implemented as a single element comprising the constituent elements described herein. Moreover, it is to be understood that the data transformation circuit 114 and the data transformation circuit 204 may be implemented in some aspects as a single element having functionality for both performing a first data transformation as well as performing a second data transformation that reverses the effects of the first data transformation.

In exemplary operation, the memory controller 102 receives a memory read request 206 from a requestor 208, as indicated by arrow 210. The memory controller, per conventional operation, transmits a memory read command 212 to the memory device 104 to retrieve the requested data, as indicated by arrow 214. The memory access intercept circuit 108 subsequently intercepts a transmission of transformed data 216 (i.e., data that was previously modified by the data transformation circuit 114 of the memory access intercept circuit 108 prior to being stored in the memory device 104 during a write as described with respect to FIG. 1) from the memory device 104 directed to the memory controller 102 responsive to the memory read command 212, as indicated by arrow 218. Upon intercepting the transformed data 216, the memory access intercept circuit 108 generates a read transaction ID (captioned as "READ TRANS ID" in FIG. 2) 220 for the memory read command 212. As with the write transaction ID 122 discussed above, the read transaction ID 220 may be created using conventional techniques for generating unique identifiers, and is used internally by the memory access intercept circuit 108 for tracking and processing the memory read request 206. In some aspects, the read transaction ID 220 may comprise an indicator (e.g., a highest bit of the read transaction ID, as a non-limiting example) that may be used to indicate that the read transaction ID 220 is associated with a memory read operation.

The memory access intercept circuit 108 uses the data transformation circuit 204 to perform a data transformation on the transformed data 216 to obtain read data 222, as indicated by arrow 224. The data transformation performed by the data transformation circuit 204 may comprise, e.g., performing decryption of the transformed data 216, and/or performing decoding of a custom ECC 144 of the transformed data 216, as non-limiting examples. The memory access intercept circuit 108 next stores the read data 222 in the read data buffer 202 as indicated by arrow 226, and generates proxy read data 228 comprising the read transaction ID 220, as indicated by arrow 230. The memory access intercept circuit 108 then transmits the read transaction ID 220 to the memory controller 102 as the proxy read data 228, as indicated by arrow 232. Note that, in aspects in which the memory controller 102 expects data having a same size as a memory access size of the memory controller 102 but the read transaction ID 220 is smaller than the expected data size, the proxy read data 228 may comprise a plurality of copies of the read transaction ID 220.

The memory access intercept circuit 108 subsequently intercepts a transmission of the proxy read data 228 from the memory controller 102 directed to the requestor 208, as indicated by arrow 234. The memory access intercept circuit 108 retrieves the read data 222 from the read data buffer 202 based on the read transaction ID 220 of the proxy read data 228, and transmits the read data 222 to the requestor 208 as indicated by arrow 236. In this manner, the memory access intercept circuit 108 can manipulate data read from the memory device 104 in a manner that is transparent to the requestor 208, the memory controller 102, and the memory device 104.

In some aspects, conventional memory controllers such as the memory controller 102 are capable of performing an RMW operation, which may be necessary in circumstances in which the size of data to be written to the memory device 104 is smaller than a memory access size of the memory controller 102 and/or the memory device 104. In such circumstances, the memory controller 102 performs a memory read operation to retrieve a memory block containing the memory address to which a memory write request is directed. The memory block is then modified by the memory controller 102 to merge the write data of the memory write request with the read data from the memory block (e.g., by overwriting the contents at the specified memory address). The modified memory block is then written back to the memory device 104. To ensure data consistency, the memory controller 102 performs the RMW operation as an atomic operation, such that the RMW operation is successful only if each of the individual read, modify, and write operations are successful.

Figure 3:
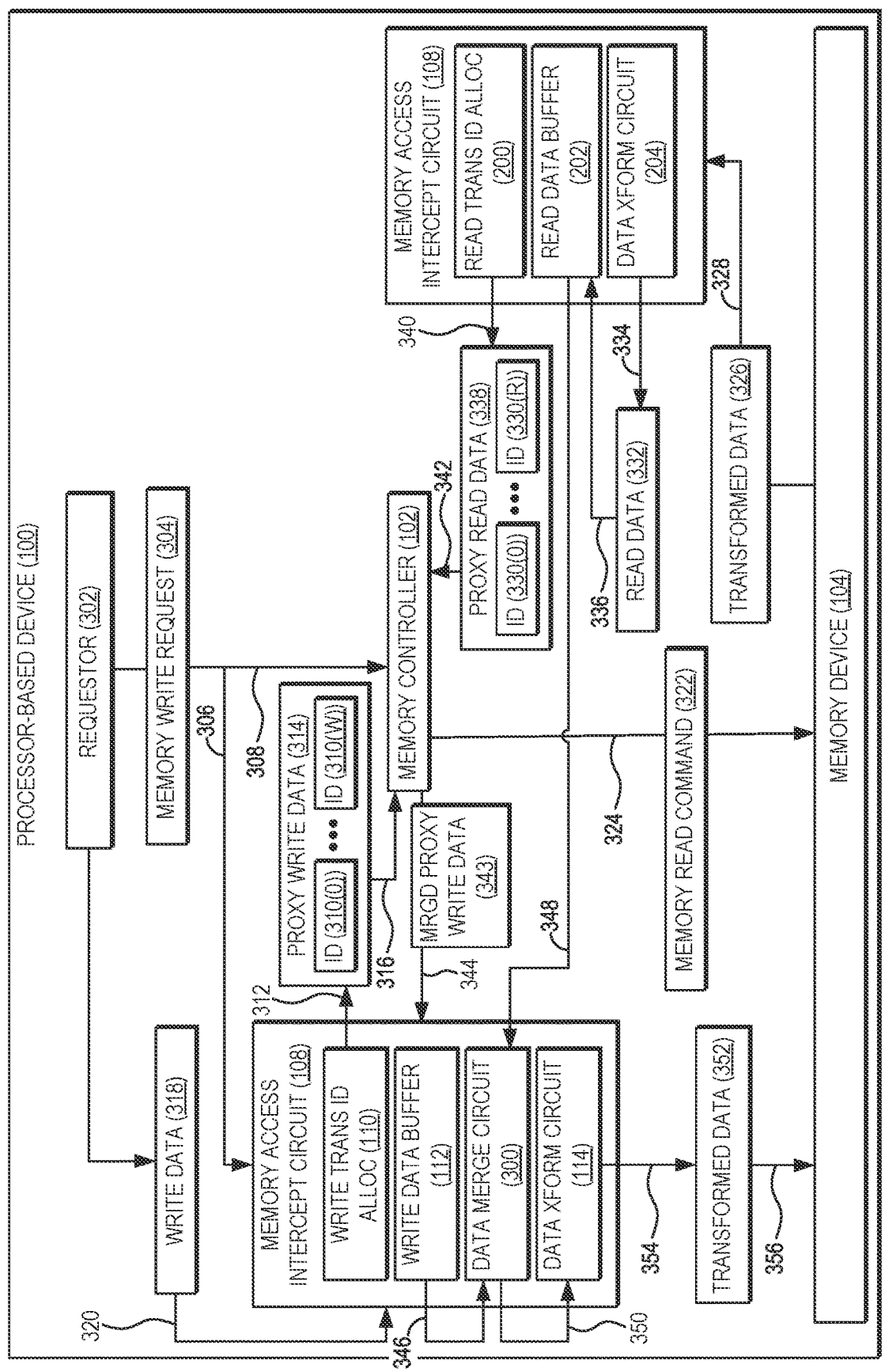
FIG. 3 is a block diagram of yet another aspect of the processor-based device of FIG. 1, illustrating exemplary functionality of the memory access intercept circuit for intercepting and processing memory write requests that require a Read/Modify/Write (RMW) operation, according to some aspects.

In this regard, FIG. 3 illustrates yet another aspect of the processor-based device 100 of FIG. 1, in which the memory access intercept circuit 108 is configured to intercept and process memory write requests that require an RMW operation. As seen in FIG. 3, the memory access intercept circuit 108 comprises the write transaction ID allocation circuit (captioned as "WRITE TRANS ALLOC ID") 110, the write data buffer 112, and the data transformation circuit (captioned as "DATA XFORM CIRCUIT") 114 of FIG. 1, as well as the read transaction ID allocation circuit (captioned as "READ TRANS ALLOC ID") 200, the read data buffer 202, and the data transformation circuit (captioned as "DATA XFORM CIRCUIT") 204 of FIG. 2. The memory access intercept circuit 108 in the aspect illustrated in FIG. 3 further comprises a data merge circuit 300, which is employed by the memory access intercept circuit 108 to combine write data and read data when performing an RMW operation.

In the example of FIG. 3, the memory access intercept circuit 108 is configured to receive, from a requestor 302, a memory write request 304 (as indicated by arrow 306) that is directed to the memory controller 102, and that is also received by the memory controller 102 (as indicated by arrow 308). The memory access intercept circuit 108 generates a write transaction ID (captioned as "ID" in FIG. 3) 310(0) for the memory write request 304. As indicated by arrow 312, the memory access intercept circuit 108 next generates proxy write data 314 that is a same size as the memory access size of the memory controller 102, and that comprises a plurality of copies 310(0)-310(W) of the write transaction ID 310(0). The memory access intercept circuit 108 then transmits the write transaction ID 310(0) to the memory controller 102 as the proxy write data 314, as indicated by arrow 316. The memory access intercept circuit 108 subsequently intercepts write data 318 from the requestor 302 directed to the memory controller 102 for the memory write request 304, as indicated by arrow 320. The memory access intercept circuit 108 stores the write data 318 in the write data buffer 112 in association with the write transaction ID 310(0).

Because the memory write request 304 in the example of FIG. 3 requires an RMW operation, the memory controller 102 sends a memory read command 322 to the memory device 104 to obtain the memory block to be modified, as indicated by arrow 324. The memory access intercept circuit 108 then intercepts a transmission of transformed data 326 (i.e., data that was previously modified by the data transformation circuit 114 of the memory access intercept circuit 108 prior to being stored in the memory device 104) from the memory device 104 directed to the memory controller 102 responsive to the memory read command 322 from the memory controller 102, as indicated by arrow 328. The memory access intercept circuit 108 generates a read transaction ID (captioned as "ID" in FIG. 3) 330(0) for the memory read command 322. The memory access intercept circuit 108 also employs the data transformation circuit 204 to perform a data transformation on the transformed data 326 to obtain read data 332, as indicated by arrow 334. The memory access intercept circuit 108 stores the read data 332 in the read data buffer 202 in association with the read transaction ID 330(0), as indicated by arrow 336. The memory access intercept circuit 108 then generates proxy read data 338 comprising read transaction IDs 330(0)-330(R), which comprise a plurality of copies 330(0)-330(R) of the read transaction ID 330(0), as indicated by arrow 340. The memory access intercept circuit 108 transmits the proxy read data 338 to the memory controller 102, as indicated by arrow 342.

At this point, the memory controller 102 has received the proxy write data 314 and the proxy read data 338 in lieu of the actual write data 318 and the actual read data 332, respectively. As noted above, the proxy write data 314 comprises the copies 310(0)-310(W) of the write transaction ID 310(0) assigned by the memory access intercept circuit 108, while the proxy read data 338 comprises the copies 330(0)-330(R) of the read transaction ID 330(0) assigned by the memory access intercept circuit 108. The memory controller 102 merges the proxy write data 314 and the proxy read data 338 using conventional functionality for performing an RMW operation, resulting in merged proxy write data (captioned as "MRGD PROXY WRITE DATA" in FIG. 3) 343 in which some of the read transaction IDs 330(0)-330(R) have been overwritten by some of the write transaction IDs 310(0)-310(W). The memory access intercept circuit 108 then intercepts a transmission of the merged proxy write data 343 (comprising the write transaction ID 310(0) and the read transaction ID 330(0)) from the memory controller 102 directed to the memory device 104, as indicated by arrow 344.

Based on the write transaction ID 310(0) of the merged proxy write data 343, the memory access intercept circuit 108 retrieves the write data 318 from the write data buffer 112, as indicated by arrow 346. The memory access intercept circuit 108 also retrieves the read data 332 from the read data buffer 202 based on the read transaction ID 330(0) of the merged proxy write data 343, as indicated by arrow 348. Using the data merge circuit 300, the memory access intercept circuit 108 merges the write data 318 with the read data 332. In aspects in which the write transaction ID 310(0) and the read transaction ID 330(0) (and the copies thereof in the proxy write data 314 and the proxy read data 338) include indicators of the respective types of memory access operations, the data merge circuit 300 may employ such indicators in performing the merge operation (i.e., to determine which portions of the write data 318 and the read data 332 to overwrite or to retain). The memory access intercept circuit 108 forwards the merged data to the data transformation circuit 114, as indicated by arrow 350. The memory access intercept circuit 108 uses the data transformation circuit 114 to perform a data transformation on the write data 318 to generate transformed data 352, as indicated by arrow 354. The memory access intercept circuit 108 then transmits the transformed data 352 to the memory device 104, as indicated by arrow 356.

To illustrate exemplary operations of the memory access intercept circuit 108 for intercepting and processing memory write requests to extend functionality of the memory controller 102 as discussed above with respect to FIG. 1, FIGS. 4A and 4B provide a flowchart 400. Elements of FIG. 1 are referenced in describing FIGS. 4A and 4B for the sake of clarity. It is to be understood that, according to some aspects, the operations in FIGS. 4A and 4B may be performed in an order other than that shown herein, and/or may be omitted.

Figure 4A:
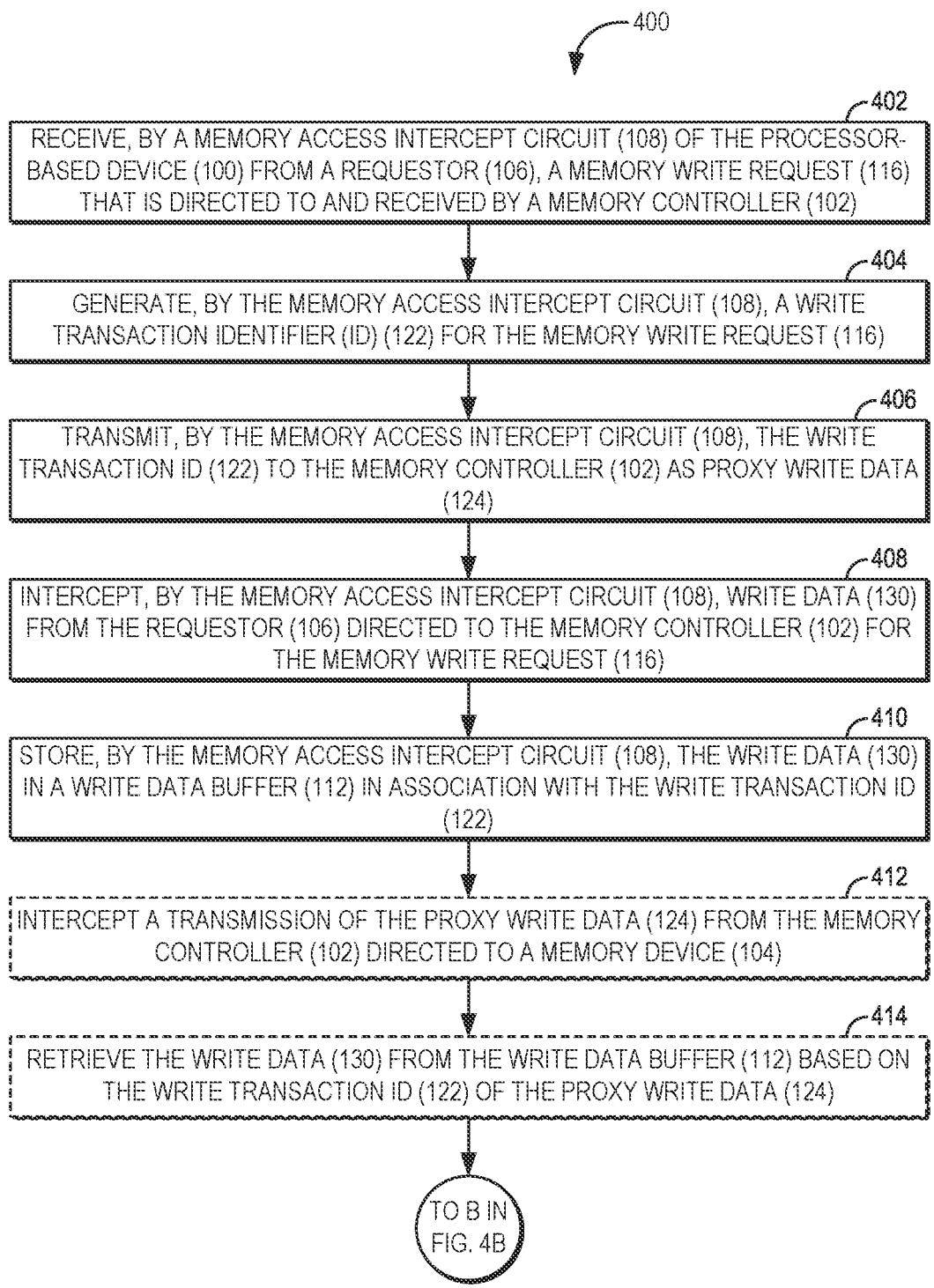
FIGS. 4A and 4B provide a flowchart illustrating exemplary operations for intercepting and processing memory write requests for extending functionality of memory controllers in a processor-based device, according to some aspects.

Operations in FIG. 4A begin with the memory access intercept circuit 108 receiving, from a requestor such as the requestor 106 of FIG. 1, a memory write request (e.g., the memory write request 116 of FIG. 1) that is directed to and received by the memory controller 102 (block 402). The memory access intercept circuit 108 generates a write transaction ID (e.g., the write transaction ID 122 of FIG. 1) for the memory write request 116 (block 404). The memory access intercept circuit 108 then transmits the write transaction ID 122 to the memory controller 102 as proxy write data (e.g., the proxy write data 124 of FIG. 1) (block 406). The memory access intercept circuit 108 subsequently intercepts write data (e.g., the write data 130 of FIG. 1) from the requestor 106 directed to the memory controller 102 for the memory write request 116 (block 408). The memory access intercept circuit 108 stores the write data 130 in a write data buffer (e.g., the write data buffer 112 of FIG. 1) in association with the write transaction ID 122 (block 410). In some aspects, the memory access intercept circuit 108 intercepts a transmission of the proxy write data 124 from the memory controller 102 directed to a memory device (e.g., the memory device 104 of FIG. 1) (block 412). The memory access intercept circuit 108 in such aspects retrieves the write data 130 from the write data buffer 112 based on the write transaction ID 122 of the proxy write data 124 (block 414). Operations then continue at block 416 of FIG. 4B.

Figure 4B:
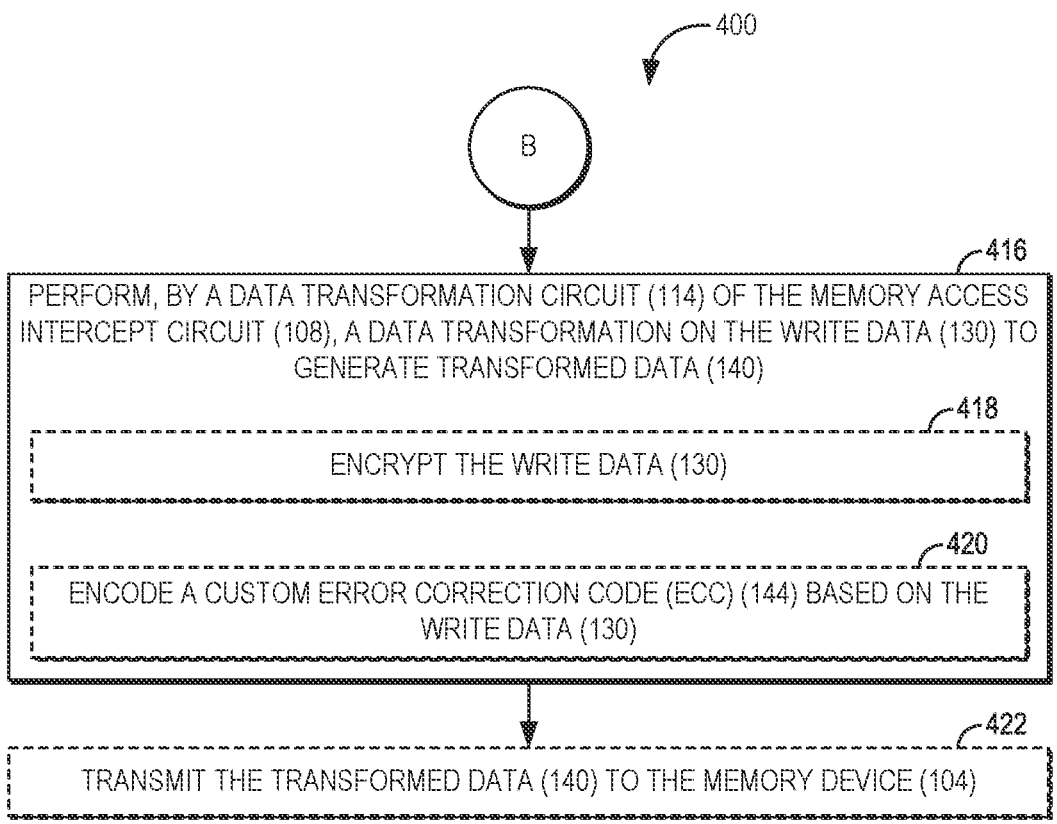

Referring now to FIG. 4B, the memory access intercept circuit 108 next performs, using a data transformation circuit of the memory access intercept circuit 108 (e.g., the data transformation circuit 114 of FIG. 1), a data transformation on the write data 130 to generate transformed data 140 (block 416). In some aspects, the operations of block 416 for performing the data transformation on the write data 130 to generate the transformed data 140 may comprise the data transformation circuit 114 encrypting the write data 130 (block 418). Some aspects may provide that the operations of block 416 for performing the data transformation on the write data 130 to generate the transformed data 140 may comprise encoding a custom ECC (e.g., the custom ECC 144 of FIG. 1) based on the write data 130 (block 420). The memory access intercept circuit 108 then transmits the transformed data 140 to the memory device 104 (block 422).

Figure 5A:
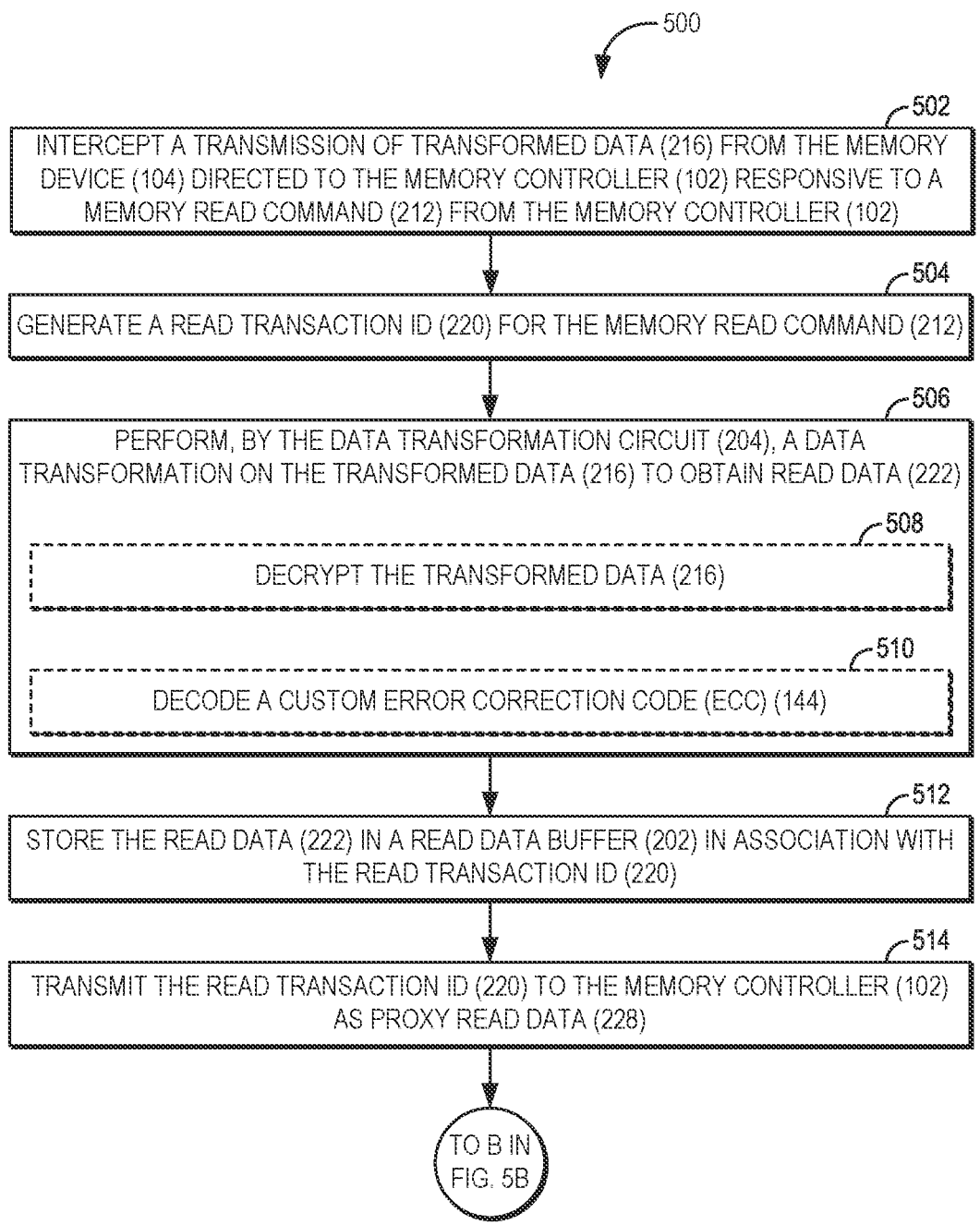
FIGS. 5A and 5B provide a flowchart illustrating exemplary operations for intercepting and processing memory read requests for extending functionality of memory controllers in a processor-based device, according to some aspects.
Figure 5B:
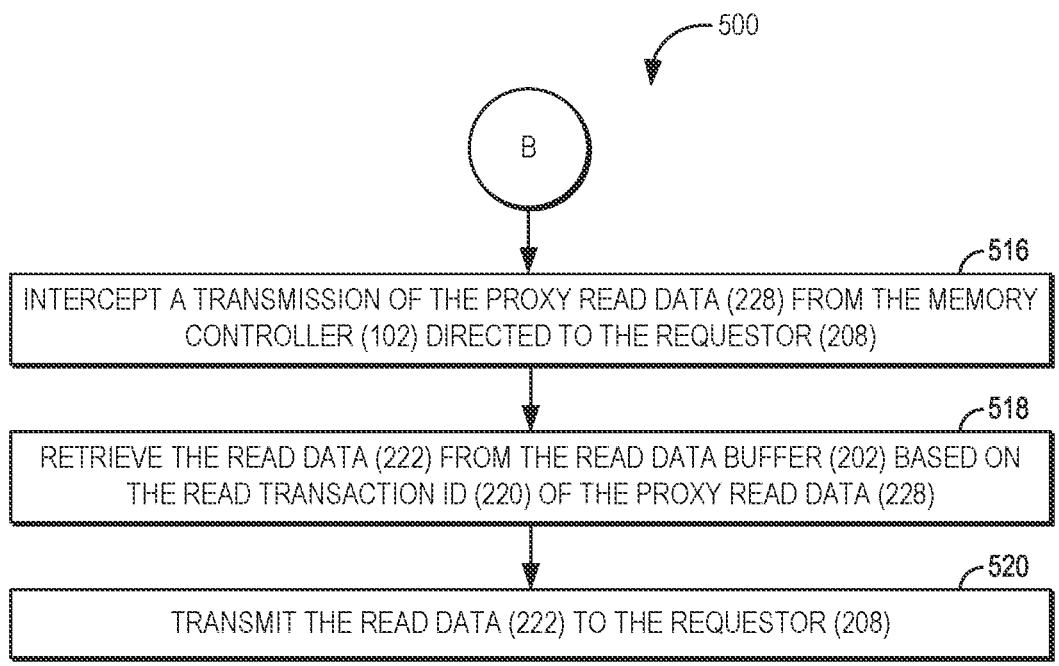

FIGS. 5A and 5B provide a flowchart 500 for illustrating exemplary operations of some aspects of the memory access intercept circuit 108 for intercepting and processing memory read requests to extend functionality of the memory controller 102 as discussed above with respect to FIG. 2. Elements of FIG. 2 are referenced in describing FIGS. 5A and 5B for the sake of clarity. It is to be understood that some aspects may provide that the operations in FIGS. 5A and 5B may be performed in an order other than that shown herein, and/or may be omitted.

In FIG. 5A, operations begin with the memory access intercept circuit 108 intercepting a transmission of transformed data (e.g., the transformed data 216 of FIG. 2) from a memory device (e.g., the memory device 104 of FIG. 2) directed to the memory controller 102 responsive to a memory read command (e.g., the memory read command 212 of FIG. 2) from the memory controller 102 (block 502). The memory access intercept circuit 108 generates a read transaction ID (e.g., the read transaction ID 220 of FIG. 2) for the memory read command 212 (block 504). The memory access intercept circuit 108 then performs a data transformation on the transformed data 216 to obtain read data (e.g., the read data 222 of FIG. 2) (block 506). According to some aspects, the operations of block 506 for performing the data transformation on the transformed data 216 to obtain the read data 222 may comprise decrypting the transformed data 216 (block 508). Some aspects may provide that the operations of block 506 for performing the data transformation on the transformed data 216 to obtain the read data 222 may comprise decoding a custom ECC (e.g., the custom ECC 144 of FIG. 2) (block 510). The memory access intercept circuit 108 stores the read data 222 in a read data buffer (e.g., the read data buffer 202 of FIG. 2) in association with the read transaction ID 220 (block 512). The memory access intercept circuit 108 then transmits the read transaction ID 220 to the memory controller 102 as proxy read data (e.g., the proxy read data 228 of FIG. 2) (block 514). Operations then continue at block 516 of FIG. 5B.

Turning now to FIG. 5B, the memory access intercept circuit 108 subsequently intercepts a transmission of the proxy read data 228 from the memory controller 102 directed to the requestor 208 (block 516). The memory access intercept circuit 108 retrieves the read data 222 from the read data buffer 202 based on the read transaction ID 220 of the proxy read data 228 (block 518). The memory access intercept circuit 108 then transmits the read data 222 to the requestor 208 (block 520).

To illustrate exemplary operations of some aspects of the memory access intercept circuit 108 for intercepting and processing memory write requests that require an RMW operation as discussed above with respect to FIG. 3, FIGS. 6A-6C provide a flowchart 600. For the sake of clarity, elements of FIG. 3 are referenced in describing FIGS. 6A-6C. It is to be understood that, in some aspects, the operations in FIGS. 6A-6C may be performed in an order other than that shown herein, and/or may be omitted.

Operations in FIG. 6A begin with the memory access intercept circuit 108 receiving, from a requestor such as the requestor 302 of FIG. 3, a memory write request (e.g., the memory write request 304 of FIG. 3) that is directed to and received by the memory controller 102 (block 602). The memory access intercept circuit 108 generates a write transaction ID (e.g., the write transaction ID 310(0) of FIG. 3) for the memory write request 304 (block 604). The memory access intercept circuit 108 next generates proxy write data (e.g., the proxy write data 314 of FIG. 3) that is a same size as the memory access size of the memory controller 102, and that comprises a plurality of copies 310(0)-310(W) of the write transaction ID 310(0) (block 606). The memory access intercept circuit 108 then transmits the write transaction ID 310(0) to the memory controller 102 as the proxy write data 314 (block 608).

The memory access intercept circuit 108 subsequently intercepts write data (e.g., the write data 318 of FIG. 3) from the requestor 302 directed to the memory controller 102 for the memory write request 304 (block 610). The memory access intercept circuit 108 stores the write data 318 in a write data buffer (e.g., the write data buffer 112 of FIG. 3) in association with the write transaction ID 310(0) (block 612).

Figure 6B:
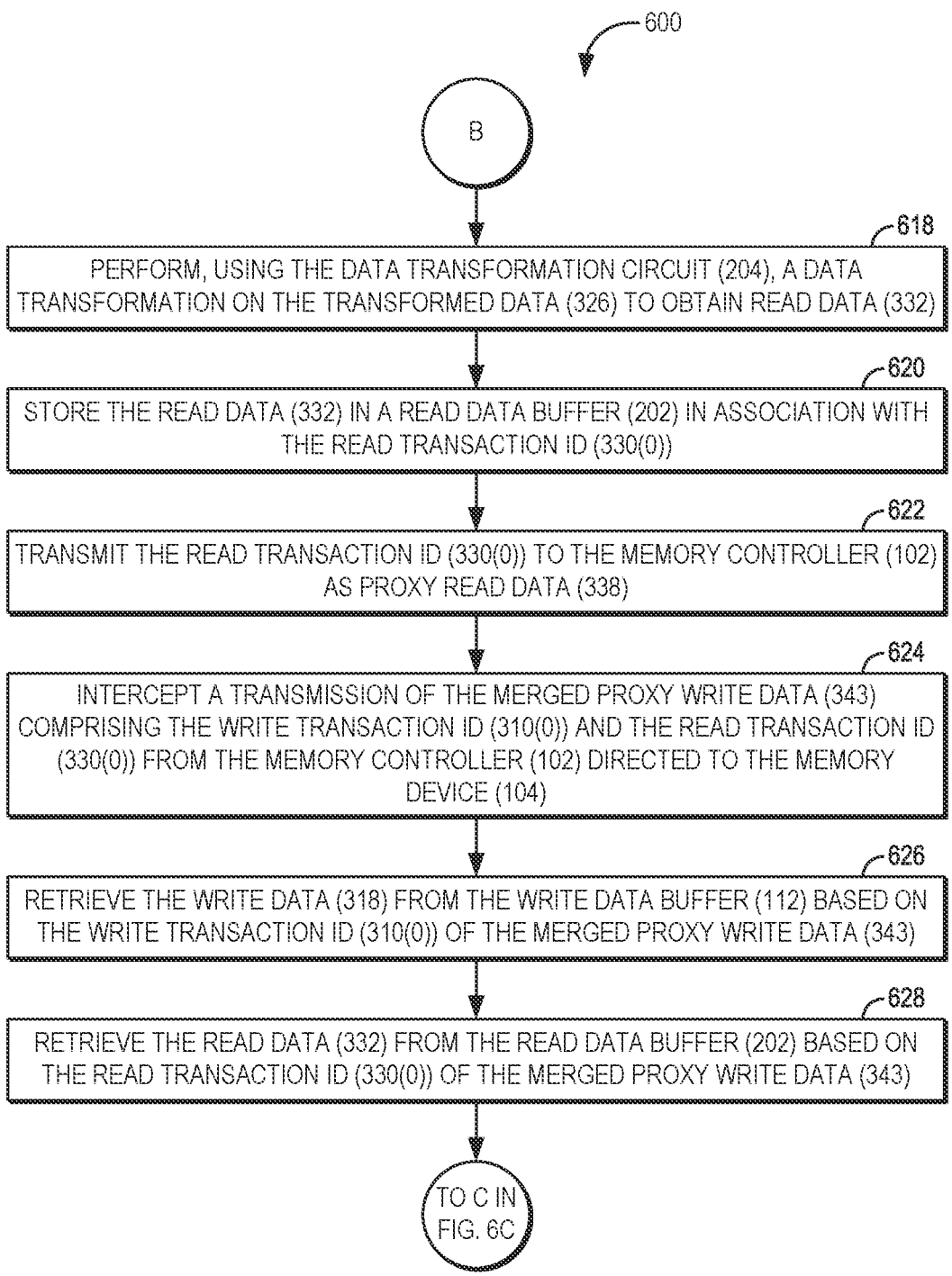
Figure 6C:
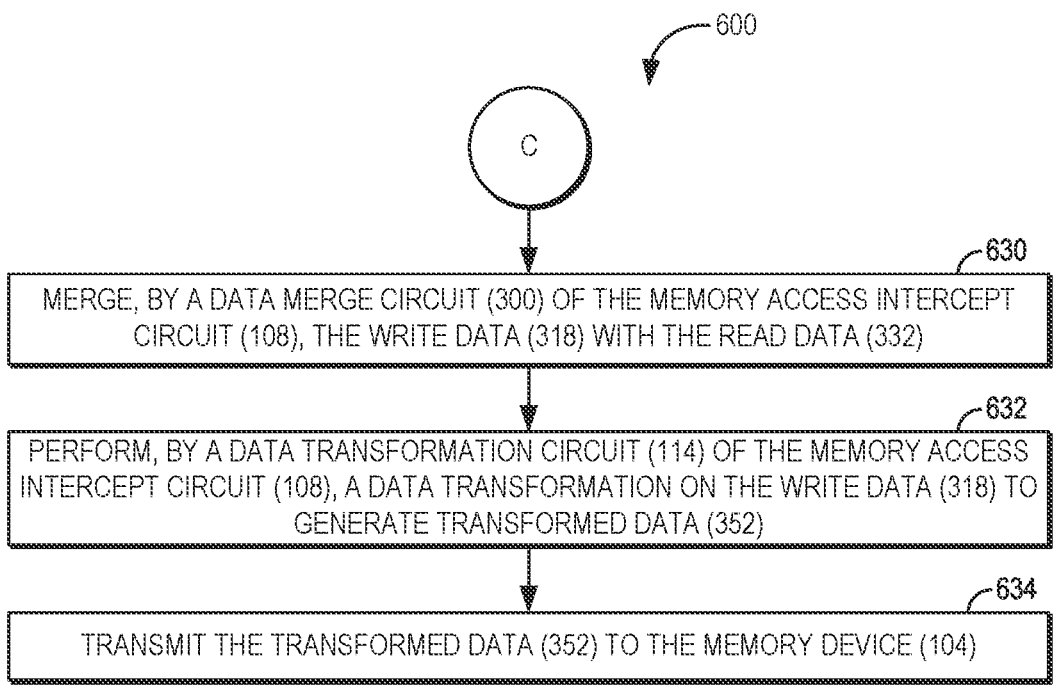

Because the memory write request 304 in the example of FIGS. 6A-6C requires an RMW operation, the memory controller 102 sends a memory read command 322 to the memory device 104 to obtain the memory block to be modified. Accordingly, the memory access intercept circuit 108 intercepts a transmission of transformed data (e.g., the transformed data 326 of FIG. 3) from the memory device 104 directed to the memory controller 102 responsive to the memory read command 322 from the memory controller 102 (block 614). The memory access intercept circuit 108 generates a read transaction ID (e.g., the read transaction ID 330(0) of FIG. 3) for the memory read command 322 (block 616). Operations then continue at block 618 of FIG. 6B.

Referring now to FIG. 6B, the memory access intercept circuit 108 performs, using a data transformation circuit (e.g., the data transformation circuit 204 of FIG. 3), a data transformation on the transformed data 326 to obtain read data (e.g., the read data 332 of FIG. 3) (block 618). The memory access intercept circuit 108 stores the read data 332 in a read data buffer (e.g., the read data buffer 202 of FIG. 3) in association with the read transaction ID 330(0) (block 620). The memory access intercept circuit 108 then transmits the read transaction ID 330(0) to the memory controller 102 as proxy read data (e.g., the proxy read data 338 of FIG. 3) (block 622).

The memory access intercept circuit 108 intercepts a transmission of merged proxy write data (e.g., the merged proxy write data 343 of FIG. 3) comprising the write transaction ID 310(0) and the read transaction ID 330(0) from the memory controller 102 directed to the memory device 104 (block 624). The memory access intercept circuit 108 retrieves the write data 318 from the write data buffer 112 based on the write transaction ID 310(0) of the merged proxy write data 343 (block 626). The memory access intercept circuit 108 then retrieves the read data 332 from the read data buffer 202 based on the read transaction ID 330(0) of the merged proxy write data 343 (block 628). Operations then continue at block 630 of FIG. 6C.

Turning now to FIG. 6C, the memory access intercept circuit 108 merges, by a data merge circuit (e.g., the data merge circuit 300 of FIG. 3) of the memory access intercept circuit 108, the write data 318 with the read data 332 (block 630). The memory access intercept circuit 108 performs, by a data transformation circuit (e.g., the data transformation circuit 114 of FIG. 3) of the memory access intercept circuit 108, a data transformation on the write data 318 to generate transformed data (e.g., the transformed data 352 of FIG. 3) (block 632). The memory access intercept circuit 108 then transmits the transformed data 352 to the memory device 104 (block 634).

The memory access intercept circuit according to aspects disclosed herein and discussed with reference to FIGS. 1-3, 4A, 4B, 5A, 5B, and 6A-6C may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
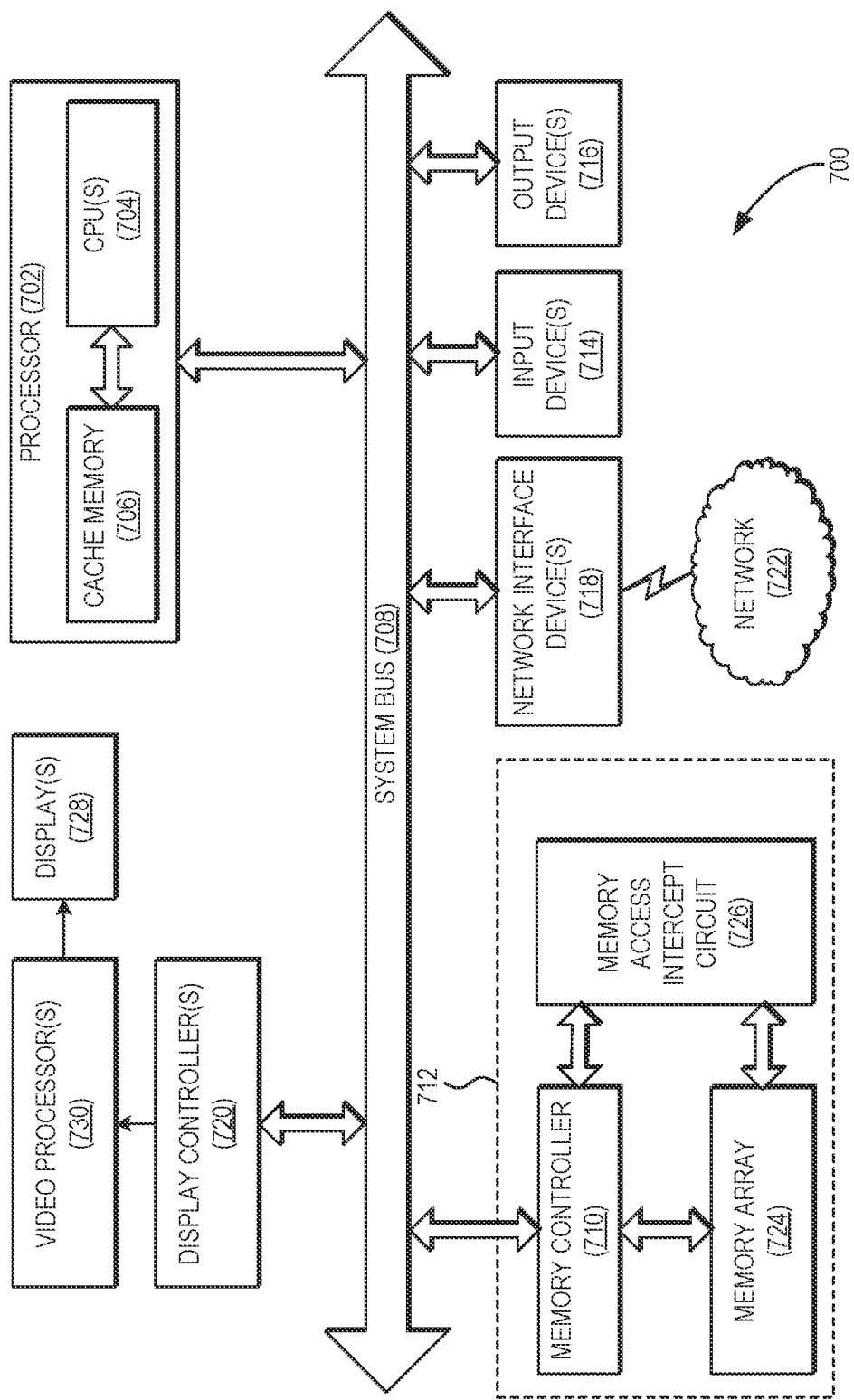
FIG. 7 is a block diagram of an exemplary processor-based device including a memory access intercept circuit.

In this regard, FIG. 7 illustrates an example of a processor-based device 700 that includes a memory access interrupt circuit as illustrated and described with respect to FIGS. 1-3, 4A, 4B, 5A, 5B, and 6A-6C. In this example, the processor-based device 700, which corresponds in functionality to the processor-based device 100 of FIGS. 1-3, includes a processor 702 which comprises one or more CPUs 704 coupled to a cache memory 706. The CPU(s) 704 is also coupled to a system bus 708, and can intercouple devices included in the processor-based device 700. As is well known, the CPU(s) 704 communicates with these other devices by exchanging address, control, and data information over the system bus 708. For example, the CPU(s) 704 can communicate bus transaction requests to a memory controller 710. Although not illustrated in FIG. 7, multiple system buses 708 could be provided, wherein each system bus 708 constitutes a different fabric.

Other devices may be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include the memory controller 710 coupled to one or more memory arrays 724 and a memory access intercept circuit 726 (such as, e.g., the memory access intercept circuit 108 of FIGS. 1-3).

The CPU(s) 704 may also be configured to access the display controller(s) 720 over the system bus 708 to control information sent to one or more displays 728. The display controller(s) 720 sends information to the display(s) 728 to be displayed via one or more video processors 730, which process the information to be displayed into a format suitable for the display(s) 728. The display(s) 728 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based device, comprising:
   a memory controller;
   a memory device communicatively coupled to the memory controller; and
   a memory access intercept circuit, configured to:
   receive, from a requestor, a memory write request that is directed to and received by the memory controller;
   generate a write transaction identifier (ID) for the memory write request;
   transmit the write transaction ID to the memory controller as proxy write data;
   intercept write data from the requestor directed to the memory controller for the memory write request; and
   store the write data in a write data buffer in association with the write transaction ID.

2. The processor-based device of claim 1, wherein:
   a size of the write transaction ID is smaller than a memory access size of the memory controller; and the memory access intercept circuit is further configured
to generate the proxy write data that is a same size as
the memory access size of the memory controller, and
that comprises a plurality of copies of the write transaction ID.

3. The processor-based device of claim 1, wherein the memory access intercept circuit is further configured to:
intercept a transmission of the proxy write data from the memory controller directed to the memory device;
retrieve the write data from the write data buffer based on the write transaction ID of the proxy write data;
perform, using a data transformation circuit, a first data transformation on the write data to generate first transformed data; and
transmit the first transformed data to the memory device.

4. The processor-based device of claim 3, wherein the memory access intercept circuit is configured to perform the first data transformation by being configured to encrypt the write data.

5. The processor-based device of claim 3 wherein the memory access intercept circuit is configured to perform the first data transformation by being configured to encode a custom error correction code (ECC) based on the write data.

6. The processor-based device of claim 3, wherein the memory access intercept circuit is further configured to:
intercept a transmission of second transformed data from the memory device directed to the memory controller responsive to a memory read command from the memory controller;
generate a read transaction ID for the memory read command;
perform, using the data transformation circuit, a second data transformation on the second transformed data to obtain read data;
store the read data in a read data buffer in association with the read transaction ID; and
transmit the read transaction ID to the memory controller as proxy read data.

7. The processor-based device of claim 6, wherein the memory access intercept circuit is configured to perform the second data transformation by being configured to decrypt the second transformed data.

8. The processor-based device of claim 6, wherein the memory access intercept circuit is configured to perform the second data transformation by being configured to decode a custom error correction code (ECC).

9. The processor-based device of claim 6, wherein the memory access intercept circuit is further configured to:
intercept a transmission of the proxy read data from the memory controller directed to the requestor;
retrieve the read data from the read data buffer based on the read transaction ID of the proxy read data; and
transmit the read data to the requestor.

10. The processor-based device of claim 6, wherein:
the proxy write data intercepted from the memory controller directed to the memory device comprises merged proxy write data that comprises the write transaction ID and the read transaction ID; and
the memory access intercept circuit is further configured to, prior to performing the first data transformation on the write data to generate the first transformed data:
retrieve the read data from the read data buffer based on the read transaction ID of the merged proxy write data; and
merge, by a data merge circuit of the memory access intercept circuit, the write data with the read data.

11. A method for extending functionality of memory controllers in a processor-based device, comprising:
receiving, by a memory access intercept circuit of the processor-based device from a requestor, a memory write request that is directed to and received by a memory controller;
generating, by the memory access intercept circuit, a write transaction identifier (ID) for the memory write request;
transmitting, by the memory access intercept circuit, the write transaction ID to the memory controller as proxy write data;
intercepting, by the memory access intercept circuit, write data from the requestor directed to the memory controller for the memory write request; and
storing, by the memory access intercept circuit, the write data in a write data buffer in association with the write transaction ID.

12. The method of claim 11, wherein:
a size of the write transaction ID is smaller than a memory access size of the memory controller; and
the method further comprises generating the proxy write data that is a same size as the memory access size of the memory controller, and that comprises a plurality of copies of the write transaction ID.

13. The method of claim 11, further comprising:
intercepting a transmission of the proxy write data from the memory controller directed to a memory device;
retrieving the write data from the write data buffer based on the write transaction ID of the proxy write data;
performing, by a data transformation circuit of the memory access intercept circuit, a first data transformation on the write data to generate first transformed data; and
transmitting the first transformed data to the memory device.

14. The method of claim 13, wherein performing the first data transformation comprises encrypting the write data.

15. The method of claim 13 wherein performing the first data transformation comprises encoding a custom error correction code (ECC) based on the write data.

16. The method of claim 13, further comprising:
intercepting a transmission of second transformed data from the memory device directed to the memory controller responsive to a memory read command from the memory controller;
generating a read transaction ID for the memory read command;
performing, by the data transformation circuit, a second data transformation on the second transformed data to obtain read data;
storing the read data in a read data buffer in association with the read transaction ID; and
transmitting the read transaction ID to the memory controller as proxy read data.

17. The method of claim 16, wherein performing the second data transformation comprises decrypting the second transformed data.

18. The method of claim 16, further comprising:
intercepting a transmission of the proxy read data from the memory controller directed to the requestor;
retrieving the read data from the read data buffer based on the read transaction ID of the proxy read data; and
transmitting the read data to the requestor.

19. The method of claim 16, wherein:
the proxy write data intercepted from the memory controller directed to the memory device comprises merged proxy write data that comprises the write transaction ID and the read transaction ID; and the method further comprises, prior to performing the first data transformation on the write data to generate the first transformed data:

retrieving the read data from the read data buffer based on the read transaction ID of the merged proxy write data; and merging, by a data merge circuit of the memory access intercept circuit, the write data with the read data.

* * * * *